United States Patent
Bedy

(10) Patent No.: US 11,113,061 B2
(45) Date of Patent: Sep. 7, 2021

(54) REGISTER SAVING FOR FUNCTION CALLING

(71) Applicant: Advanced Micro Devices, Inc., Santa Clara, CA (US)

(72) Inventor: Michael John Bedy, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/584,775

(22) Filed: Sep. 26, 2019

(65) Prior Publication Data

US 2021/0096864 A1 Apr. 1, 2021

(51) Int. Cl.
*G06F 9/30* (2018.01)

(52) U.S. Cl.
CPC ...... *G06F 9/30141* (2013.01); *G06F 9/30018* (2013.01)

(58) Field of Classification Search
None
See application file for complete search history.

(56) References Cited

U.S. PATENT DOCUMENTS

| | | | | |
|---|---|---|---|---|
| 5,555,428 A | * | 9/1996 | Radigan | G06F 9/30072 712/22 |
| 8,661,232 B2 | * | 2/2014 | Penton | G06F 9/3834 712/228 |
| 9,250,904 B2 | * | 2/2016 | Gschwind | G06F 9/30058 |
| 9,792,125 B2 | * | 10/2017 | Greiner | G06F 9/3863 |
| 2004/0068642 A1 | * | 4/2004 | Tanaka | G06F 9/30036 712/223 |
| 2007/0033384 A1 | * | 2/2007 | Nankaku | G06F 9/4812 712/233 |
| 2016/0147559 A1 | * | 5/2016 | Weimer | G06F 9/461 712/228 |

* cited by examiner

*Primary Examiner* — Michael Sun
(74) *Attorney, Agent, or Firm* — Volpe Koenig

(57) ABSTRACT

Described herein are techniques for saving registers in the event of a function call. The techniques include modifying a program including a block of code designated as a calling code that calls a function. The modifying includes modifying the calling code to set a register usage mask indicating which registers are in use at the time of the function call. The modifying also includes modifying the function to combine the information of the register usage mask with information indicating registers used by the function to generate registers to be saved and save the registers to be saved.

20 Claims, 5 Drawing Sheets

(12) United States Patent
US 11,113,061 B2

REGISTER SAVING FOR FUNCTION CALLING

BACKGROUND

Processors such as single-instruction multiple-data ("SIMD") processors achieve parallelization of execution by using a single control flow module with multiple items of data. While the complexity of the hardware needed to achieve such parallel execution resulted in certain restrictions to the types of control flow that occur, as time progresses, advancements made improve the flexibility of such control flow types.

BRIEF DESCRIPTION OF THE DRAWINGS

A more detailed understanding is gained from the following description, given by way of example in conjunction with the accompanying drawings wherein.

DETAILED DESCRIPTION

Described herein are techniques for saving registers in the event of a function call. The techniques include modifying a program including a block of code designated as a calling code that calls a function. The modifying includes modifying the calling code to set a register usage mask indicating which registers are in use at the time of the function call. The modifying also includes modifying the function to combine the information of the register usage mask with information indicating registers used by the function to generate registers to be saved and save the registers to be saved.

Figure 1:
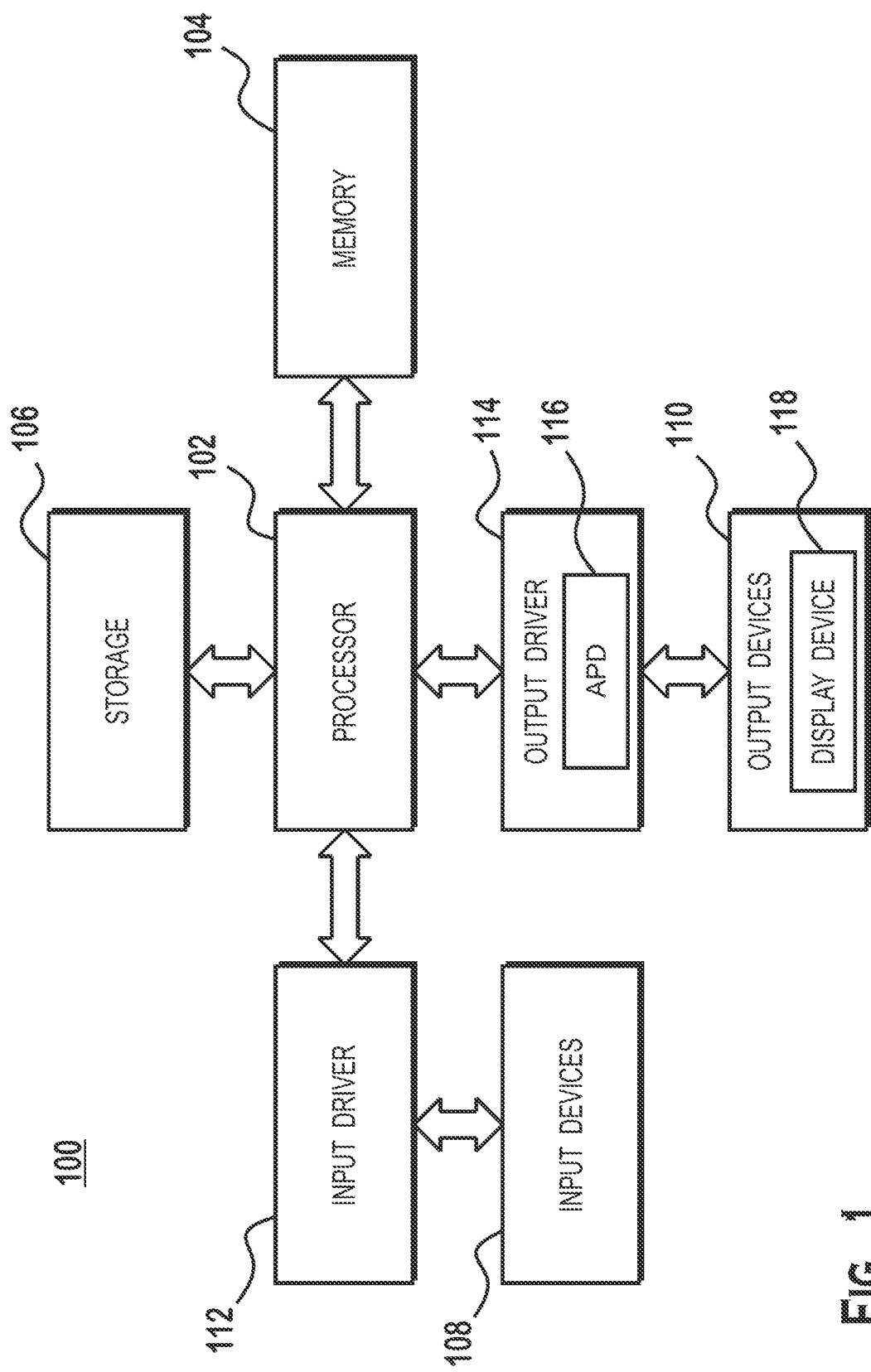
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein.

Figure 2:
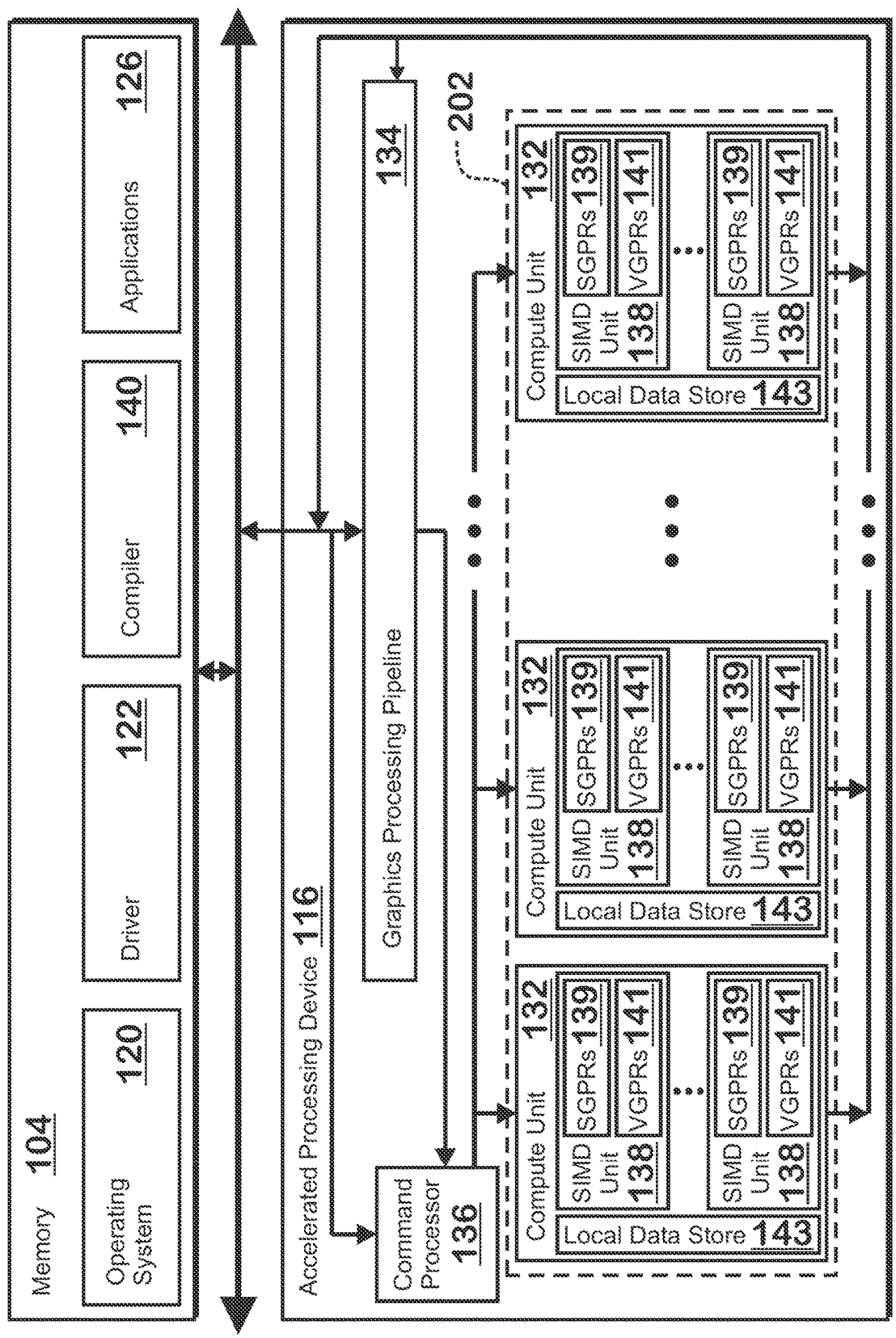
FIG. 2 is a block diagram of the device, illustrating additional details related to execution of processing tasks on the accelerated processing device, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, an optional compiler 140, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and an offline compiler that compiles applications for execution on the CPU 102 compiles shader programs for execution on the APD 116. In some implementations, an offline compiler compiles shader program code into an intermediate representation and a just-in-time compiler compiles the intermediate representation into machine code. In other implementations, an offline compiler compiles shader program code directly into machine code. In various implementations, the compiler 140 illustrated in FIG. 2 is any such compiler. It is also possible for the compiler 140 to exist in a computer system that is different from a computer system that ultimately executes compiler shader programs. Thus, in some implementations, steps described as being performed by the compiler 140 are performed by a different computer system than the computer system that executes the shader program compiled by the compiler 140. It is therefore possible to perform the operations described as being performed by a compiler 140 herein in a computer system that does not execute the compiled shader program, or to execute the compiled shader program in a computer system that does not include the compiler 140.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not related, or not directly related to graphics operations, such as operations related to video, physics simulations, computational fluid dynamics, or other tasks, based on commands received from the processor 102. The APD 116 also executes compute processing operations that are related to ray tracing-based graphics rendering.

The APD 116 includes compute units 132 (which are sometimes referred to collectively herein as parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed together as a "wavefront" on a single SIMD processing unit 138. The SIMD nature of the SIMD processing unit 138 allows multiple work-items to execute in parallel simultaneously. Work-items that are executed together in this manner on a single SIMD unit are part of the same wavefront. In some implementations or modes of operation, a SIMD unit 138 executes a wavefront by executing each of the work-items of the wavefront simultaneously. In other implementations or modes of operation, a SIMD unit 138 executes different sub-sets of the work-items in a wavefront in parallel. In an example, a wavefront includes 64 work-items and the SIMD unit 138 has 16 lanes (where each lane is a unit of the hardware sized to execute a single work-item). In this example, the SIMD unit 138 executes the wavefront by executing 16 work-items simultaneously, 4 times.

One or more wavefronts are included in a "workgroup," which includes a collection of work-items designated to execute the same shader program. An application or other entity (a "host") requests that shader programs be executed by the accelerated processing device 116, specifying a "size" (number of work-items), and the command processor 136 generates one or more workgroups to execute that work. The number of workgroups, number of wavefronts in each workgroup, and number of work-items in each wavefront correlates to the size of work requested by the host. In some implementations, the host specifies the number of work-items in each workgroup for a particular request to perform work, and this specification dictates the number of workgroups generated by the command processor 136 to perform the work. As stated above, the command processor 136 dispatches workgroups to one or more compute units 132, which execute the appropriate number of wavefronts to complete the workgroups.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

Shader programs executing in SIMD units 138 are able to make function calls Functions are code within a shader program that is called by code within the shader program. Function calls are direct function calls or indirect function calls. A direct function call is a call where the identity of the function being called is known at compile-time. An indirect function call is a function call where the identity of the function being called is not known until runtime. One mechanism by which indirect function calls are made is a call to a function pointer. The function pointer stores the address of the function and is set at runtime by other code.

In general, functions are called by jumping to the beginning address of the function, but other tasks are sometimes needed. In an example, it is sometimes necessary to save the registers that are in use by calling code before proceeding with the body of a called function. Referring to FIG. 2, such registers include scalar general purpose registers ("SGPRs") 139 and/or vector general purpose registers ("VGPRs") 141. If a called function uses certain registers, then those registers are backed up to memory, such as a global memory, the local data store 143, or some other memory, before the called function writes to those registers. As is generally known, registers are low level memory used by processing units as a scratch space for calculations. Registers typically have lower latency and higher speed than other memory locations, such as the local data store 143. The local data store 143 belongs to a particular compute unit 132. The local data store 143 is high speed memory that is addressable directly by instructions executing in the compute unit 132.

One way to back-up registers when a function is called is to simply back-up all of the registers. However, the number of registers available for use by a shader program is large, and the amount of data stored, especially in the vector general purpose registers 141, which are typically very large, is very high. Thus, in the process of generating shader programs, the compiler 140 inserts instructions to save the VGPRs 141 that are used by both the code that calls a function and the code of the function, but does not insert instructions to save the VGPRs 141 that are used by the code that calls the function but not by the code of the function. In some implementations, the techniques are used to limit which SGPRs 139 are saved as well, but because the total amount of data in the SGPRs 139 is typically much lower than the amount of data in the VGPRs 141, limiting which VGPRs 141 are backed up provides a greater benefit than limiting which SGPRs 139 are backed up. As described herein, registers used by both the calling code and the called function are sometimes referred to herein as "commonly used registers."

For direct function calls, it is possible to determine which registers are commonly used registers at compile-time, because the compiler 140 knows which registers the calling code uses, which registers the called function uses, and which function is being called. However, for indirect function calls and recursive function calls, the compiler 140 does not know at compile time which registers are commonly-used registers. Therefore, the compiler 140 inserts instructions into the calling code and into a called function to determine, at runtime, which registers are to be saved, and also to save the determined registers.

Figure 3:
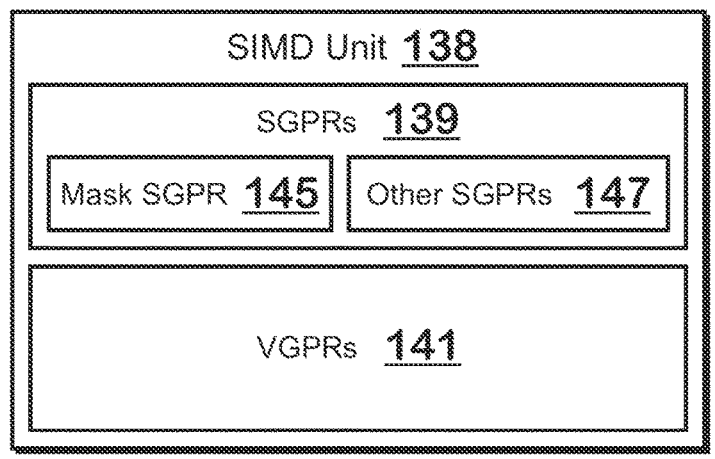
FIG. 3 illustrates details of a SIMD unit related to commonly-used registers to be saved when a function is called, according to an example.

FIG. 3 illustrates details of a SIMD unit 138 related to commonly-used registers to be saved when a function is called, according to an example. The SIMD unit 138 is a parallel processing unit that includes various processing elements not shown, such as instruction fetch logic, arithmetic logic units, and other units for executing instructions of a shader program in a SIMD manner. The SIMD unit 138 also includes the SGPRs 139, which are scalar general purpose registers that are used by a scalar unit to perform scalar operations. The SIMD unit 138 also includes VGPRs 141 that are used by vector processing units that execute parallel SIMD instructions. The VGPRs 141 are high capacity registers that often store multiple items of data operated on multiple lanes simultaneously. Specifically, each VGPR 141 contains one value for each lane. Typically, each VGPR 141 is many times larger than an SGPR 139. In some implementations, SGPRs are stored to lanes of VGPRs (for example, each VGPR is capable of storing a number of SGPR values equal to the number of lanes in a wavefront) and VGPRs are stored to a global "scratch" memory. As shown in FIG. 2, the local data store 143, one possible location for storing the values in the SGPRs and VGPRs, is a memory unit that is directly accessible to the functional elements of a compute unit 132. In other implementations, any other memory is used to store the values in the VGPRs or the SGPRs.

A mask SGPR 145 is an SGPR 145 designated to store a mask indicating which registers are in use by the calling code. In some implementations, this register is designated simply by a convention created by the compiler 140. By this convention, the calling code and the called function refer to this register to determine which registers are in use by the calling code. The other SGPRs 147 are SGPRs 139 that do not store this mask information and in some instances are used for other purposes. To determine which registers the called function is to store, the called function combines the information of which registers are used by the calling code with information indicating which registers are used by the called function.

In one example, "combining" the information about which registers are used by the calling code and which are used by the calling function is performed with a bitwise AND operation. Such an operation would generate a result that indicates which registers are used by both the calling code and the called function. After this combining operation, the called function saves the registers indicated by the combining operation to a memory location such as the local data store 143.

Upon terminating (i.e., at the end of the called function), the called function restores the saved registers so that the calling code is able to use the correct values. In various implementations, the information indicating which registers were saved is stored in a designated location such as a particular SGPR 139 during the pendency of the called function.

A few additional operations are performed in or to facilitate nested indirect or recursive function calls. If the mask SGPR 145 is in use when a function makes an indirect or recursive function call, then the function making the indirect or recursive function call saves the value in the mask SGPR 145 to a memory location such as in the local data store 143, another SGPR 139, or in another location. The mask SGPR 145 is considered in use in the situation that some code in the current function call stack used the mask SGPR 145 to indicate registers in use for a prior function call. In various implementations, an indication that code in the current function call stack used the mask SGPR 145 in this manner is stored in a flag (such as in an SGPR 139 or in memory such as the local data store 143), or is derived from the contents of the mask SGPR 145 itself. In one example, to derive this information from the contents of the mask SGPR 145, the function making the indirect or recursive function call determines whether the mask SGPR 145 is not set to a default value. In an example, a default value indicates that all registers are in use by the calling code. If the mask SGPR 145 is not set to a default value, then the mask SGPR 145 is considered in use. When the indirect or recursive function returns, the function making the indirect or recursive function restores the saved value to the mask SGPR 145.

Figure 4:
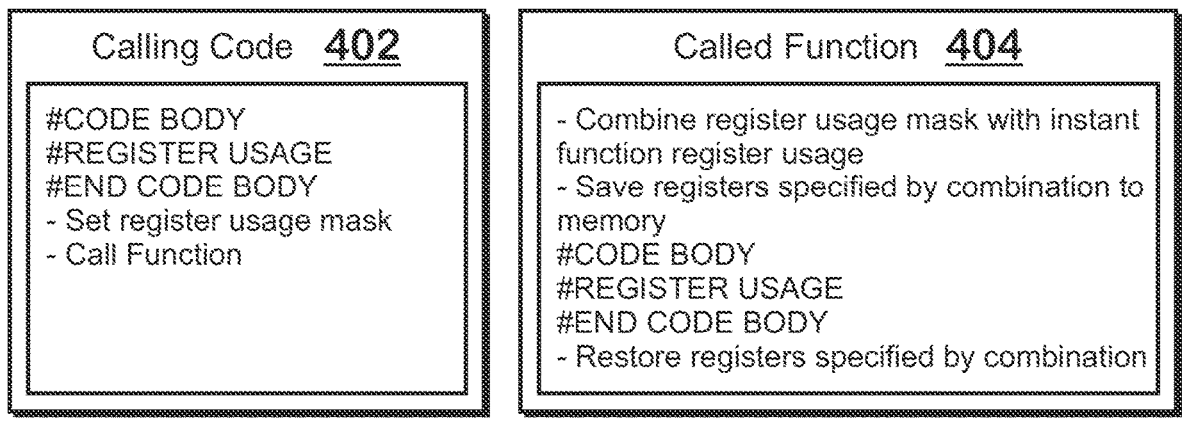
FIG. 4 illustrates example compiler operations for generating calling code and functions to be called.

FIG. 4 illustrates example compiler operations for generating calling code and functions to be called. Calling code 402 illustrates code that is to make an indirect or recursive function call. The calling code 402 is the body of a function or is the "main" code of a shader program, outside of a function.

The calling code 402 includes a code body (delimited by "#CODE BODY" and "#END CODE BODY"), which includes operations performed by the calling code 402 not specifically related to calling the function. The code body includes register usage (indicated by "#REGISTER USAGE"), in which certain registers, such as certain VGPRs 141 and/or certain SGPRs 147 are used by one or more instructions. After the code body, there are one or more instructions to set the mask in the mask SGPR 145 to a value indicating which registers are in use. Subsequently, there are one or more instructions to perform an indirect or recursive function call to the called function 404. Although not shown, in some implementations, there are additional code bodies and function calls after the instructions illustrated in FIG. 4.

The value set into the mask SGPR 145 is as follows. The registers in use by the calling code 402—specifically, the registers that are in use in the calling code 402 at the time of the function call—are included in the mask. In addition, if the calling code 402 is itself a function that is called while the mask SGPR 145 is in use, then the set register usage mask instructions sets the value in the mask SGPR 145 as follows. The value set in the mask SGPR 145 indicates that the following sets of registers are in use: the registers that are in use by the calling code 402 at the time that the function call is made; and all of the registers indicated by the mask SGPR 145 as being used at the time that the function embodied as the calling code 402 is called, less the registers that were saved by that function when that function began and that are not in use by the calling code 402 (i.e., according to the mechanism described herein).

Note that the registers that are in use by the calling code 402 does not necessarily include all registers that the calling code 402 will ever use, but only those registers that are live at the time the function call to the called function 404 is made. As is generally known, a live register stores a value that will be read by an instruction in the future, while a dead register stores a value that will not be read in the future. Put another way, a register is live if a read to that register will be performed before the next write to that register, and a register is dead if the next write to that register will occur before a read to that register. Registers that store live values "across" a function call are registers whose values should be saved, and thus those registers are identified in the mask SGPR 145. Note also that the result of setting the value in the mask SGPR 145 as described above is that if registers are in use by some code in the function call stack at the time the call to the called function 404 is made, and were not saved by the calling code 402, and those registers are used by the called function 404, then those registers will be saved. In addition, registers in use by the calling code 402 and by the called function 404 will be saved.

In an example, the calling code 402 is a function that is indirectly or recursively called by main code of a shader program. The main code sets the value in the SGPR 145 to indicate that vector registers 1-40 are used. The calling code 402, itself, uses vector registers 11-20. Thus, when the calling code 402 itself is indirectly called as a function, the calling code 402 saves registers 11-20. The calling code 402 includes an indirect function call to a called function 404. At the time of this function call, registers 11-15 are live. Thus the calling code 402 sets the value in the SGPR 145 to indicate that registers 1-15 and 21-40, but not 16-20, are used. The values in registers 16-20 were already saved by the calling code 402 when called and because those registers are not live at the time of the function call to the called function 404, the values in those registers do not need to be saved, even if the called function 404 uses those registers.

In the called function 404, the combine register usage mask with instant function register usage block is one or more instructions that combines the data stored in the mask SGPR 145 with data indicating which registers are used by the called function 404. In some examples, the combination is done by performing a bitwise AND, to generate a result indicating which registers are in use both by the calling code 402 and by the called function 404.

The save registers specified by the combination to memory block is one or more instructions that saves the registers specified by the previous block to memory (such as the local data store 143). After this, the code body, including the register usage, executes. At the end of the called function 404, the called function 404 restores the registers that were saved by the called function 404 and then returns.

The instructions for saving and restoring registers that are described above are added by the compiler 140. Specifically, before an indirect or recursive function call, the compiler 140 inserts the one or more instructions to set the value in the mask SGPR 145. Before the code body of the called function 404, the compiler 140 inserts the one or more instructions to combine the register usage of the called function 404 with the value in the register usage mask and to save registers based on that combination. In addition, the compiler 140 inserts the one or more instructions to restore registers specified by the combination after the end of the code body of the called function 404.

In some examples, the mechanism described herein for saving registers is used for indirect and recursive function calls, but not for direct function calls. Note, a recursive function call is a function call wherein a function calls itself, or where a function in the future function call hierarchy of a base function calls the base function. As described elsewhere herein, in the called function 404, one or more instructions combine the register usage mask with the registers used by the called function 404. In some examples where the mechanism described herein for saving registers is not used for direct function calls, the registers used by the called function include the registers used in the code body of the called function 404, as well as any function called in the future direct function call hierarchy. The future direct function call hierarchy is the hierarchy or chain of function calls that are directly made by the called function, including nested direct function calls. The future direct function call hierarchy does not include any indirect function calls in the chain of function calls. In an example, function 1 is the called function. Function 1 directly calls function 2, which directly calls functions 3 and 4, which call no functions. Function 1 also includes an indirect function call. In this situation, the future direct function call hierarchy includes the call to function 1, the call to function 2, and the calls to functions 3 and 4. The "registers used by the called function 404" as used above includes all registers used by functions 1, 2, 3, and 4, but does not include the registers used by the indirectly called function, since such register usage is not known at compile time. As described elsewhere herein, register saving for indirect function calls is handled with the mask SGPR 145 mechanism already described. The term "mask SGPR 145 mechanism" refers to the technique for setting the mask SGPR 145 in calling code 402 and for saving and restoring registers specified by the combination of registers used by the calling code and called code as described substantially herein.

In some examples, the mask SGPR 145 mechanism is used for indirect, direct, and recursive function calls. In that scenario, the registers used by the called function includes the registers used in the code body of the called function 404, but not the registers used in functions called by the called function.

Note that the compiler 140 inserts the instructions for the mask SGPR 145 mechanism into various functions. In the scenario where the register saving mechanism is not used for direct function calls, one optimization is to only insert such instructions into functions that can possibly be called indirectly or recursively. The compiler knows which functions can be called indirectly or recursively by examining the entire shader program or by examining information provided by the system invoking the compiler. In the scenario where the mask SGPR 145 mechanism is used for direct function calls as well, the above instructions are inserted into functions that are called indirectly and functions that are called directly.

Note also that it is possible for a function to be called both directly and indirectly. Thus it is possible that a function only sometimes uses the mask SGPR 145 mechanism. Thus in some implementations, in the scenario where the register saving mechanism is only used for indirect or recursive function calls, when the calling code 402 calls a function indirectly or recursively, the calling code 402 transmits an indication to the called function 404 that the mask SGPR 145 mechanism is to be used to save registers. When the called function 404 executes, if the called function 404 detects the indication, the called function 404 saves the registers as described with respect to FIGS. 3 and 4. If the called function 404 does not detect the indication, meaning the function was called directly, then the called function 404 does not save the registers using the mask SGPR 145 mechanism.

In various implementations, the mask SGPR 145 mechanism is used to store VGPRs 141 and not SGPRs 139, or is used to store VGPRs 141 and SGPRs 145. In some implementations, the masking mechanism is also used to save registers other than VGPRs or SGPRs, in either the hardware described herein or in other hardware.

Figure 5:
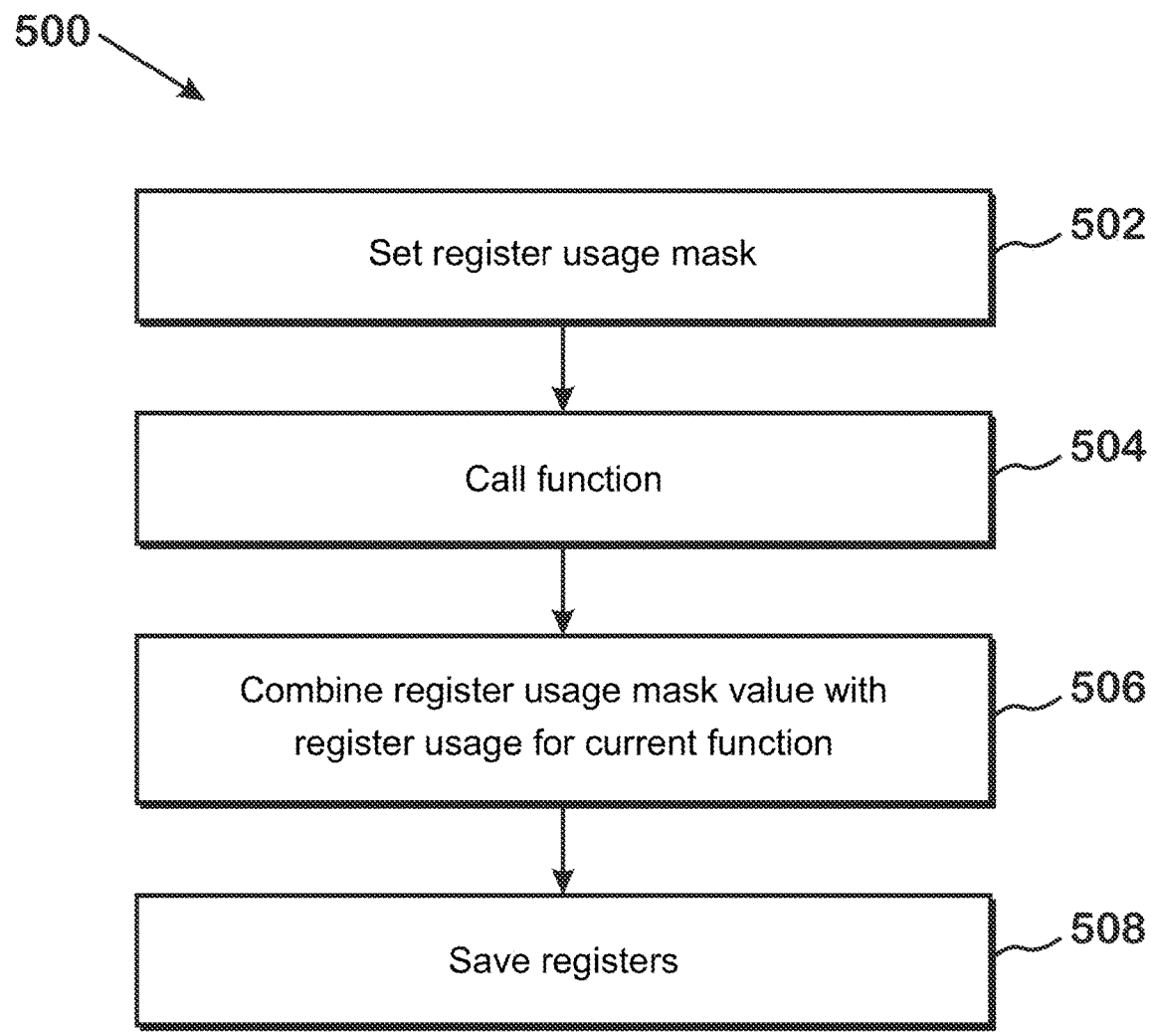
FIG. 5 is a flow diagram of a method for saving registers across a function call, according to an example.

FIG. 5 is a flow diagram of a method 500 for saving registers across a function call, according to an example. The method 500 is executed at a function call. In some implementations, the method 500 is executed at indirect and recursive function calls but not at direct function calls. In other implementations, the method 500 is executed at indirect, recursive, and direct function calls.

The method 500 begins at step 502, where the calling code sets the register usage mask. The register usage mask is set to indicate the registers that are live in the calling code 402 at the time the function call is made. In addition, if the calling code 402 is itself a function that saved registers according to the mask SGPR mechanism, then the register mask includes the value in the SGPR register that was passed into the function of the calling code 402, less the registers that are not live in the calling code 402 at the time the function call is made. At step 504, the call to the called function 504 is made.

At step 506, the called function 404 combines the value in the SGPR with the registers that are to be used by the called function 404. In an example, such combining includes performing a bitwise AND on the value in the SGPR and a mask indicating the registers to be used by the called function 404. In some examples where the mechanism described herein for saving registers is not used for direct function calls, the registers used by the called function include the registers used in the code body of the called function 404, as well as any function called in the future direct function call hierarchy. The future direct function call hierarchy is the hierarchy or chain of function calls that are directly made by the called function, including nested direct function calls. The future direct function call hierarchy does not include any indirect function calls in the chain of function calls. In some examples, the mask SGPR 145 mechanism is used for indirect, direct, and recursive function calls. In that scenario, the registers used by the called function includes the registers used in the code body of the called function 404, but not the registers used in functions called by the called function.

At step 508, the called function 404 saves the registers indicated by the combination of the value of the mask SGPR register 415 and the registers used by the called function 404. Saving registers includes storing the registers in a memory location such as the local data store 143 or another memory.

Figure 6:
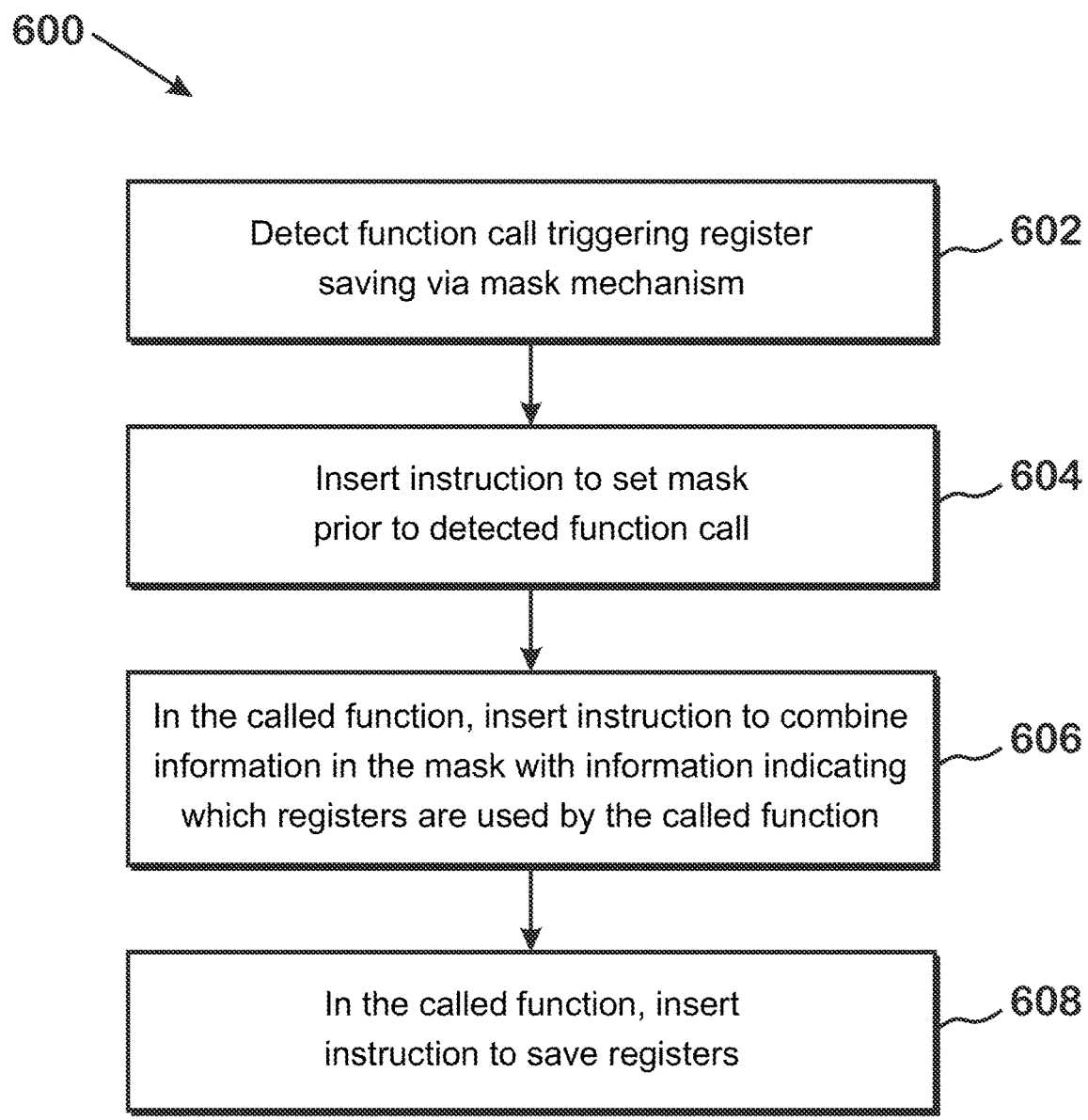
FIG. 6 illustrates an example method for modifying a shader program to include instructions to save registers according to the teachings described herein.

FIG. 6 illustrates an example method 600 for modifying a shader program to include instructions to save registers according to the teachings described herein. The compiler 140 analyzes and modifies code to perform the steps of the method 600. The method 600 begins at step 602, where the compiler 140 detects a function call that triggers register saving. If the technique is not used for direct function calls, then step 602 occurs when the compiler 140 detects an indirect or recursive function call. An indirect function call is a function call whose target is specified at runtime. A recursive function call is a call by a function to itself or is a call within the future call hierarchy of a function that is a call to that function. If the technique is used for direct function calls, then step 602 occurs when the compiler 140 detects an indirect, direct, or recursive function call.

At step 604, the compiler 140 inserts instructions to set the mask prior to making the detected function call. The mask, which, in some implementations, is stored in the mask SGPR register 415, is set to have the value of the registers that are currently live in the calling code 402. If the mask SGPR is already in use (for example, it was set by another function in the current function call stack), then the compiler 140 also includes an instruction to save the value of that register. In addition, if the mask SGPR is already in use, then the instruction to set the mask value sets the value in the SGPR to include the registers that the mask already indicates (i.e., the registers that are indicated as being used by the function call stack), but to not include the registers that are used by the calling code 402 but are not live at the time that the function call detected at step 602 is made. If the mask SGPR is not already in use, then the instruction to set the mask includes the registers that are live at the time the function call detected at step 602 is made.

At step 606, in the called function 406, the compiler 140 includes instructions to combine the information in the mask SGPR 415 with information indicating which registers are used by the called function. In an example, such combining includes performing a bitwise AND on the value in the SGPR and a mask indicating the registers to be used by the called function 404. In some examples where the mechanism described herein for saving registers is not used for direct function calls, the registers used by the called function include the registers used in the code body of the called function 404, as well as any function called in the future direct function call hierarchy. The future direct function call hierarchy is the hierarchy or chain of function calls that are directly made by the called function, including nested direct function calls. The future direct function call hierarchy does not include any indirect function calls in the chain of function calls. In some examples, the mask SGPR 145 mechanism is used for indirect, direct, and recursive function calls. In that scenario, the registers used by the called function includes the registers used in the code body of the called function 404, but not the registers used in functions called by the called function. At step 608, in the called function 406, the compiler inserts instructions to save registers indicated by the combining operation. The registers are saved to a memory location such as the local data store 143.

It should be understood that many variations are possible based on the disclosure herein. Although features and elements are described above in particular combinations, each feature or element can be used alone without the other features and elements or in various combinations with or without other features and elements. In one example, although the techniques have been described in the context of SIMD processors, the techniques are alternatively used for multiple-instruction-multiple-data ("MIMD") processors.

The various functional units illustrated in the figures and/or described herein (including, but not limited to, the processor 102, the input driver 112, the input devices 108, the output driver 114, the output devices 110, the accelerated processing device 116, the command processor 136, the graphics processing pipeline 134, the compute units 132, and the SIMD units 138) are, in various implementations, implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for saving registers in the event of a function call, the method comprising:
   modifying a program including a block of code designated as a calling code that calls a function, the modifying including:
   modifying the calling code to:
      set a register usage mask indicating which registers are in use at the time of the function call; and
   modifying the function to:
      combine the information of the register usage mask with information indicating registers used by the function to generate an indication of which registers are to be saved; and
      save the registers to be saved.

2. The method of claim 1, wherein the registers to be saved comprise vector general purpose registers.

3. The method of claim 1, wherein the registers that are in use at the time of the function call comprise:
   registers that are live at the time that the function call is made.

4. The method of claim 3, wherein:
   the calling code comprises a second function having a set of used registers, wherein the second function receives a prior version of the register usage mask upon being called; and
   the registers that are in use at the time of the function call further include registers indicated by the prior version of the register usage mask, but not registers of the set of used registers that are not live at the time of the function call.

5. The method of claim 1, further comprising:
   modifying the calling code to save the register usage mask prior to setting the register usage mask.

6. The method of claim 1, wherein combining the information of the register usage mask with information indicating registers used by the function comprises performing a bitwise AND operation on the information of the register usage mask and information indicating registers used by the function.

7. The method of claim 1, wherein the registers used by the function comprise registers used within a body of the function.

8. The method of claim 1, wherein the registers used by the function further include registers used by functions directly called by the function.

9. The method of claim 1, further comprising:
   modifying the function to, prior to returning to the calling code, restore the saved registers.

10. A computing device for saving registers in the event of a function call, the computing device comprising:
    a processor; and
    a memory storing instructions that, when executed by the processor, cause the processor to:
       modify a program including a block of code designated as a calling code that calls a function, the modifying including:
       modifying the calling code to:
          set a register usage mask indicating which registers are in use at the time of the function call; and
       modify the function to:
          combine the information of the register usage mask with information indicating registers used by the function to generate an indication of which registers are to be saved; and
          save the registers to be saved.

11. The computing device of claim 10, wherein the registers to be saved comprise vector general purpose registers.

12. The computing device of claim 10, wherein the registers that are in use at the time of the function call comprise:
    registers that are live at the time that the function call is made.

13. The computing device of claim 12, wherein:
    the calling code comprises a second function having a set of used registers, wherein the second function receives a prior version of the register usage mask upon being called; and
    the registers that are in use at the time of the function call further include registers indicated by the prior version of the register usage mask, but not registers of the set of used registers that are not live at the time of the function call.

14. The computing device of claim 10, wherein the instructions further cause the processor to:
    save the register usage mask prior to setting the register usage mask.

15. The computing device of claim 10, wherein combining the information of the register usage mask with information indicating registers used by the function comprises performing a bitwise AND operation on the information of the register usage mask and information indicating registers used by the function.

16. The computing device of claim 10, wherein the registers used by the function comprise registers used within a body of the function.

17. The computing device of claim 10, wherein the registers used by the function further include registers used by functions directly called by the function.

18. The computing device of claim 10, wherein the instructions further cause the processor to:
- modify the function to, prior to returning to the calling code, restore the saved registers.

19. A non-transitory computer-readable medium storing instructions that, when executed by a processor, cause the processor to:
- modify a program including a block of code designated as a calling code that calls a function, the modifying including:
- modifying the calling code to:
  - set a register usage mask indicating which registers are in use at the time of the function call; and
- modify the function to:
  - combine the information of the register usage mask with information indicating registers used by the function to generate an indication of which registers are to be saved; and
- save the registers to be saved.

20. The non-transitory computer-readable medium of claim 19, wherein the registers that are in use at the time of the function call comprise:
- registers that are live at the time that the function call is made.

* * * * *